US007783743B1

(12) United States Patent
Brown

(10) Patent No.: US 7,783,743 B1
(45) Date of Patent: Aug. 24, 2010

(54) METHODS AND APPARATUS FOR PROCESSING ELECTRONIC MAIL-RELATED DATA

(75) Inventor: Kevin David Brown, Chattaroy, WA (US)

(73) Assignee: EMC Corporation, Hopkinton, MA (US)

( * ) Notice: Subject to any disclaimer, the term of this patent is extended or adjusted under 35 U.S.C. 154(b) by 966 days.

(21) Appl. No.: 11/233,843

(22) Filed: Sep. 23, 2005

(51) Int. Cl.
*G06F 15/173* (2006.01)
(52) U.S. Cl. ........................ 709/224; 709/217; 707/705
(58) Field of Classification Search .................. 709/224, 709/217; 707/705
See application file for complete search history.

(56) References Cited

U.S. PATENT DOCUMENTS 6,327,593 B1 * 12/2001 Goiffon ...................... 707/102
2004/0078461 A1 * 4/2004 Bendich et al. ............. 709/224
2004/0088313 A1 * 5/2004 Torres ........................ 707/101
2007/0027805 A1 * 2/2007 Graves ........................ 705/40
2007/0214454 A1 * 9/2007 Edwards et al. ............. 717/176

* cited by examiner

*Primary Examiner*—Joon H Hwang
*Assistant Examiner*—Jasmine Myers
(74) *Attorney, Agent, or Firm*—Chapin IP Law, LLC

(57) ABSTRACT

A system processes data related to an electronic mail database by identifying a set of electronic mail databases within a mail domain of an organization and receiving a data collection policy identifying metrics to collect from the set of electronic mail databases. The system executes the data collection policy against at least a portion of the set of electronic mail databases to collect mail summary data containing values for the metrics for mail data stored within the electronic mail database. The system provides the mail summary data to a mail report generator to allow the mail report generator to produce a mail report based on the mail summary data.

20 Claims, 8 Drawing Sheets

METHODS AND APPARATUS FOR PROCESSING ELECTRONIC MAIL-RELATED DATA

BACKGROUND

Modern data processing systems provide computer systems that manage and store large amounts of data. As an example, many commercial organizations such as Fortune-size companies, banks, mutual fund companies or the like often operate large and complex data processing systems that require access (storage and retrieval) to many hundreds of gigabytes or even terabytes of data. Large amounts of this data are often employee related data such as public folder files and electronic mail message data that an electronic mail program maintains in storage within the organization. Computer system developers have responded to these types of data storage and information sharing requirements by creating networks, hardware devices and software specifically designed to efficiently store and allow access to such data. Networks employing such equipment and software are referred to as storage area networks or SANs.

Typical storage area networks can store data of many different types, including electronic mail data (e-mail), file system data, public folder data, and the like. Elements of a typical conventional storage area network include one or more connectivity devices such as high speed data switches or routers that interconnect the various data storage systems to one or more host or server computer systems (servers) that require access (e.g., read and/or write access) to the data in the data storage systems on behalf of client software applications operating on client computer systems.

A developer or manager of a storage area network installs and operates one or more distributed storage area network management software applications within host computers in the network to manage or administer the various managed resources (i.e., devices, host computer systems, data storage systems, switches, database applications, etc.) that operate within the storage area network. A network manager (i.e., a person) responsible for management of the network operates the network management software application(s) to perform management tasks such as performance monitoring, network analysis, storage provisioning and remote configuration and administration of the various components (i.e., software and hardware resources) operating within the network.

A conventional network management software application may have several different software components that execute independently of each other on different computer systems but that collectively interoperate together to perform network management. As an example, conventional designs of storage area network management software applications can include management station programs such as console and server processes, several agent processes that operate on remote host computers, a store process to store data collected by agents. Also, many conventional storage area network management applications provide a reporting tool or application that allows an administrator to generate and view reports concerning the data stored within the storage area network. As an example, a file system tool can collect file system data and allow the administrator to view the collected file system data stored on various devices within the storage area network. Email reporting tools allow an administrator to view a total amount of email data stored within an email system. Such reporting tools usually provide a graphical user interface that allows the user to visually view amounts of data based on size.

SUMMARY

Conventional mechanisms and techniques that provide data collection, reporting and viewing of data stored within a storage area network suffer from a variety of deficiencies. In particular, storage administration tools that collect data concerning electronic mail information and that present this data to a user are limited in functionality and are inefficient at providing specific details of the electronic email stored in an entire organization. Electronic mail server software often maintains electronic mail in a proprietary database format. Accordingly, conventional electronic mail data reporting applications simply provide an indication of the total size of mail stored in a particular user's mailbox. As an example, if there are one hundred electronic mail users within a particular organization, the conventional electronic mail reporting tool can analyze an electronic mail database to determine how many megabytes of storage each of those one hundred users are consuming for their electronic mail.

This rather simplistic conventional approach to electronic mail data analysis does not provide significant details concerning certain aspects of stored electronic mail data that might be of interest to a storage area network administrator. As an example, a storage area network administrator might be interested to know which users have a large number of attachments of a certain size or age within their mailboxes. As another example, an administrator might be interested to know the particular counts (by number), sizes and ages of the mail messages for particular users that store mail data only within certain parts of the storage area network, such as mail only for a certain department in an organization. Conventional systems do not provide such detailed analysis and reporting capabilities for electronic mail data.

Additionally, certain manufacturers of electronic mail systems and software provide other mechanisms for storing data within an electronic mail database of such systems. As an example, electronic mail systems based on an Exchange database format developed by Microsoft Corp. of Redmond, Wash., U.S.A. provide a structure called a public folder that allows users to place data such as files or attachments for access by others using electronic mail client software. Public folders maintain files, publicly accessible mail messages, attachments and the like to allow the sharing of data between users. Conventional electronic mail analysis and reporting tools provide little significant details concerning data maintained by the public folders within electronic mail databases existing in a storage area network.

Conventional mail analysis systems are also slow since they place all of the analysis of mailbox data onto a single computer system that queries mail servers to collect and process data all in a single central location. Such conventional systems do not scale well to large amounts of electronic mail data that may be distributed in many servers and stores throughout an organization.

In contrast, embodiments of the invention significantly overcome such deficiencies and provide methods and apparatus for processing data related to an electronic mail (email) system. The embodiments provide a mail analyzer that can dynamically discover and identify operation of electronic mail databases maintained by mail servers within the electronic mail domain of an organization. As an example, in a large organization such as a large company, college or university with thousands of email users, there may be many different mail servers operating within the single domain of the organization. The servers may be spread out through the organization by department, location, user groups and so forth. The system of the invention is able to identify the various mail stores or electronic mail data repositories, referred to herein as electronic mail databases, within which, respective mail servers in the domain of the organization maintain electronic mail-related data. After discovering the electronic mail databases within a mail domain of an organization, the system receives a data collection policy from the user by presenting, to the user, a graphical representation of the electronic mail databases within the electronic mail domain of the organization. In response, the mail analyzer receives, from the user, a selection of the set of electronic mail databases to which the data collection policy will be executed. The mail analyzer also receives, from the user, specific metrics to collect concerning the selected electronic mail databases. The policy also defines standard or default metrics to collect during analysis of the various user selected mail stores.

After identifying a set of electronic mail databases within a mail domain of an organization and receiving a data collection policy identifying metrics to collect from the set of electronic mail databases, the mail analyzer distributes the data collection policy to appropriate host agents operating on host computer systems that operate as mail servers. Each host agent, operating as a part of the mail analyzer system disclosed herein, executes the data collection policy against the selected electronic mail databases to collect mail summary data containing values for the metrics for mail data stored within the electronic mail databases. Depending upon the specified parameters defined in the policy, the mail analyzer code (operating in the host agent) performs a lookup within the electronic mail databases maintained by the mail server associated with that host agent to identify database objects specified by the data collection policy. For each database object identified, the mail analyzer system accesses that database object and performs a database object scan to collect values for the metrics related to that database object. The metrics can include a size metric, a count metric and an age metric associated with electronic mail data in that database object. Additionally, public folder data can be collected as well.

Depending upon the configuration, the mail analyzer can identify, for a plurality of age ranges, total sizes and counts of electronic mail messages per user mailbox that match each of a plurality of age ranges (e.g. 0-30 days, 30-60 days, 60-120 days, and so forth) for respective mailboxes of users within the domain of the organization. The mail analyzer can further identify, for a plurality of age ranges, total sizes and counts of mail attachments that match each of the plurality of age ranges for respective user electronic mailboxes within the domain of the organization. For public folders, the mail analyzer can identify, for a plurality of age ranges, total sizes of public folder data that match each of the plurality of age ranges for respective public folders within the domain of the organization. The mail analyzer in the host agent can temporarily store the collected values for the metrics as mail summary data and after collection is complete for a particular object, the mail analyzer can provide the mail summary data to a mail report generator to allow the mail report generator to produce a mail report based on the mail summary data.

In this manner, the system of the invention allows a detailed analysis of electronic mail data through out an entire organization's domain and distributes the processing across multiple host computer systems, thus not placing the entire processing burden on a single computer system.

In one configuration, the domain is an exchange-based mail domain within the organization and the mail summary data identifies count, size and age metrics for specific users mailboxes and public folders of exchange-based mail servers operating to store the electronic mail databases within a storage area network. Further details of these and other related embodiments will be explained more fully herein.

Other embodiments of the invention include a computerized device, such as a mail server, management or host computer system, workstation or other computerized device configured to process all of the method operations disclosed herein as embodiments of the invention. In such embodiments, the computerized device includes a memory system, a processor, a communications interface and an interconnection mechanism connecting these components. The memory system is encoded with a software application (e.g. an agent or mail analyzer process) that when performed on the processor, produces a corresponding process (e.g., an executing agent or mail analyzer process) that operates as explained herein within the computerized device to perform all of the method embodiments and operations explained herein as embodiments of the invention. The mail analyzer can be distributed, or operate locally in one or more computer systems.

Other arrangements of embodiments of the invention that are disclosed herein include software programs to perform the method embodiment steps and operations summarized above and disclosed in detail below for all mail analyzer processes, alone or in combination with each other. More particularly, a computer program product is disclosed that has a computer-readable medium including computer program logic encoded thereon that when performed in a computerized device provides associated operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors, controllers or circuits in the computerized device to perform the techniques explained herein as embodiments of the invention. Software processes that operate in a collection of computerized devices, such as in a group of storage area network management servers, mail servers, hosts or other entities can also provide the system of the invention. The system of the invention can be distributed between many software processes on several computers, or all processes could run on a small set of dedicated computers, or on one computer alone.

It is to be understood that the system of the invention can be embodied strictly as a software program, as software and hardware, or as hardware alone. Example embodiments of the invention may be implemented within EMC's Control Center and/or storage scope software or host or other agent applications manufactured by EMC Corporation of Hopkinton, Mass., USA. Such applications generally provide management and reporting functionality for storage area network resources.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
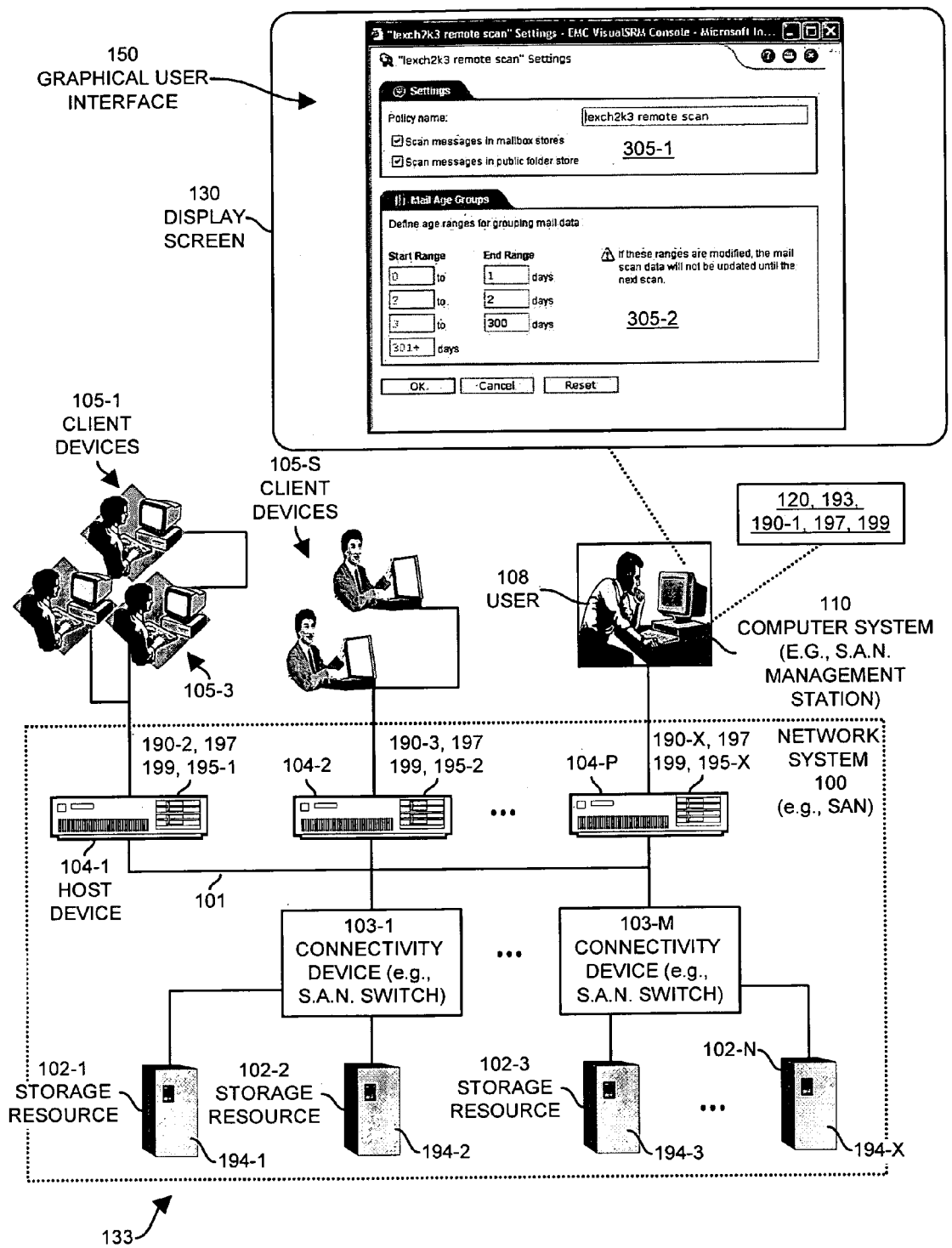
FIG. 1 illustrates an example storage area network and computing system environment including mail analyzer system configured to operate according to example embodiments of the invention.

FIG. 1 illustrates a storage area network environment 133 suitable for explaining an operation of example embodiments herein. As shown, a network system 100 (e.g., potentially including multiple types of networks) is a storage area network that includes a network medium 101 such as a high-speed data communications medium (e.g., Ethernet, optical network, or other type of network) that interconnects a plurality of components such as storage resources 102-1 through 102-N (collectively, storage resources 102 such as disk arrays), network switches 103-1 through 103-M (collectively, network switches 103 such as SAN switches), host devices 104-1 through 104-P (collectively, host devices, servers or hosts 104), client devices 105-1 through 105-S (collectively, client devices 105), and a management computer system 110 (e.g., a storage area network management station). The host devices 104 operate mail server software processes shown as mail servers 195-1 through 195-X. In this example, the mail servers 195 maintain respective electronic mail database 194-1 through 194-X that collectively operate and provide an electronic mail domain for the organization to which the network system 100 belongs. Each electronic mail database 194 stores mailbox data and/or public folder data on behalf of users of client devices 105. In this example, each host 104 further operates a respective mail analyzer processes 190-2 through 190-X that each operate as part of (e.g. as a plug-in to) a respective host agent operating within the host computers 104.

The computer system 110 includes resource manager 120 such as a storage area network management application that includes a corresponding mail analyzer process 190-1 such as a software application that supports generation of the graphical user interface 150 on the display 130. The mail analyzer 190-1 operates in conjunction with (e.g. as a server plug-in) the resource manager 120 as explained herein to generate and display information on the graphical user interface 150 on the display screen 130 in accordance with embodiments explained herein. The resource manager 120 in this example context may be any type of network management software application that executes, performs or otherwise operates within the management station computerized system 110. In this example the computer system 110 is configured as a storage area network management station operated by network manager or user 108 (e.g., a user responsible for managing resources associated with the storage area network environment 133) and the resource manager 120 is a storage area network management software application. It should be noted that the computer system 110 may include certain other components such as one or more internal devices as well as software applications or processes such as an operating system that operate within or in conjunction with the illustrated components and devices in FIG. 1.

The graphical user interface 150 allows the user 108 to enter a data collection policy 197 to the mail analyzer 190-1 that specifies metrics 305-1 and 305-2 that indicate various type of electronic mail parameters to collect from scans performed of the electronic mail databases 194. In the example interface 150 shown in FIG. 2 (that will be discussed in more detail in later figures), the user 108 is able to provide input metrics 305-1 that indicate a data collection policy name and whether to scan data in the electronic mail databases 194 related to mailboxes and/or public folders. The metrics 305-2 allow the user to specify age ranges in which to classify detected data (in days) for data such as electronic mail messages, files, attachments and so forth that the mail analyzers 190-2 through 190-X discover within the various electronic mail databases 194 during their scan of such databases as will be explained. As will be shown in other graphical user interfaces, such input also allows the user 108 to further choose what particular electronic mail databases 194 are to be scanned for the metrics of interest to that user 108. The mail analyzer 190-1 collects this information from the user 108 and stores this in the data collection policy 197. The mail analyzer 190-1 then disseminates this to the appropriate mail analyzer process 190-2 through 190-X operating as various host agents in the hosts 104 that operates mail servers 195 corresponding to (i.e., that maintain) the selected electronic mail databases 194. The mail analyzers 190-2 through 190-X on each host 104 perform or execute the data collection policy to perform a scan of the electronic mail databases 194 selected by the user to collect values for the parameters or metrics specified by the user. The mail analyzers 190-2 through 190-X further collect default metric values. Metrics that the mail analyzer collects can include counts, total sizes and ages of email messages, attachments, and files in public folders and individual user mailboxes. This information is collected and processed locally on each host to produce mail summary data 198 that is sent back from the mail analyzer processes 190-2 through 190-X to the mail analyzer 190-1 in the management computer system 110. The resource management application 120 can process the mail summary data to produce reports concerning the collected metrics. Further details of this processing will be explained with reference to the remaining figures and description below.

Figure 2:
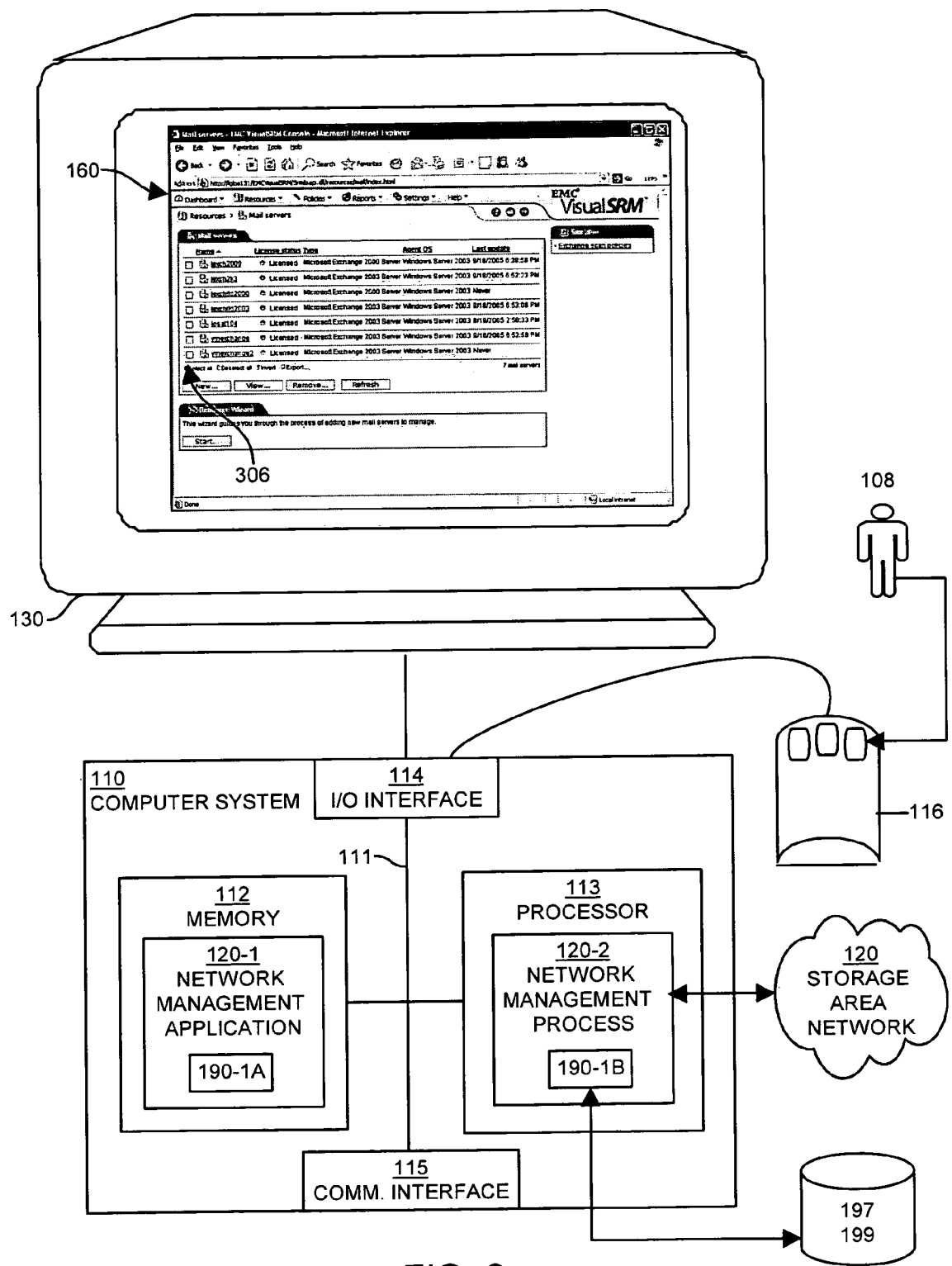
FIG. 2 is a diagram of a computer system configured with a mail analyzer and graphical user interface in accordance with example embodiments of the invention.

FIG. 2 is a block diagram illustrating an example architecture of the computer system 110 (e.g., a storage area network management station). The computer system 110 may be a digital processing device such as a personal computer, workstation, portable computing device, console, laptop, network terminal, etc. The example computer system 110 includes an interconnect 111 that couples a memory system 112, a processor 113, an input/output interface 114, and a communications interface 115. A peripheral device 116 (e.g., one or more viewer controlled devices such as a keyboard, mouse, etc.) couples to the processor 113 through the I/O interface 114 and enables the user 108 to provide input commands and thus generally control display management functions associated with graphical user interface 150. The repository 125 stores managed objects 210 associated with managed entities (e.g., hardware and software resource entities associated with host devices 104, storage resources 102, etc.) in network system 100. A communications interface 115 enables the computer system 110 (and corresponding user 108) to communicate with other devices (i.e., resources) over the network system 100.

As shown, the memory system 112 is encoded with resource manager application 120-1 including the mail analyzer application 190-1A that support generation, display, and implementation of functional operations of graphical user interface 150 and of the processing explained herein. The resource manager application 120-1 including the mail analyzer application 190-1A may be embodied as software code such as data and/or logic instructions (e.g., code stored in the memory or on another computer readable medium such as a disk) that support processing functionality of the mail analyzer 190 according to different embodiments described herein. During operation, the processor 113 accesses memory system 112 via the interconnect 111 in order to launch, run, execute, interpret or otherwise perform the logic instructions of the resource manager application 120-1 including the mail analyzer application 190-1A. Execution of resource manager application 120-1 and the mail analyzer application 190-1A produces processing functionality in resource manager process 120-2 and the mail analyzer process 190-1B that provides the management station part of the processing of the mail analyzer system 190 as explained herein. In other words, the resource manager and mail analyzer processes 120-2 and 190-1B represents one or more portions of the resource manager application 120-1 and mail analyzer application 190-1A (or the entire application 120-1, 190-1A) performing within or upon the processor 113 in the computerized device 110.

It should be noted that the resource manager 120 and mail analyzer 190 executed in computer system 110 are represented in FIG. 2 by either one or both of the resource manager application 120-1, mail analyzer application 190-1A and/or the resource manager process 120-2 and mail analyzer process 190-1B. For purposes of this discussion, general reference will be made to the mail analyzer 190 as performing or supporting the various steps and functional operations to carry out techniques discussed herein.

It should also be noted that example configurations herein include the resource manager application 120-1 itself (i.e., the un-executed or non-performing logic instructions and/or data) with mail analyzer functionality. The resource manager application 120-1 and mail analyzer application 190-1A may be stored on a computer readable medium (such as a floppy disk), hard disk, or optical medium. The resource manager application 120-1 and mail analyzer application 190-1A may also be stored in a memory system 112 such as in firmware, read only memory (ROM), or, as in this example, as executable code in, for example, Random Access Memory (RAM). In addition to these embodiments, it should also be noted that other embodiments herein include the execution of mail analyzer application 190-1A as the process 190-1B. Those skilled in the art will understand that the computer system 110 may also include other processes and/or software and hardware components, such as an operating system that facilitates carrying out management functions associated with the storage area network.

It should be noted that the functionality of the mail analyzer 190-1 within the computer system 110 can provide data collection policy retrieval form the user 108 and transmission to the mail analyzer processes 190-2 through 190-X operating in each host 104. The computer architecture of each host 104 can be similar to the computer system 110 shown in FIG. 2. In such architectures, the host 104 operates a host agent software application and process that includes the functionality of the mail analyzer 190-2 through 190-X to execute the data collection policy 197 against the electronic mail databases 194 for collection of values for the metric 305 specified in the policy 197.

Figure 3:
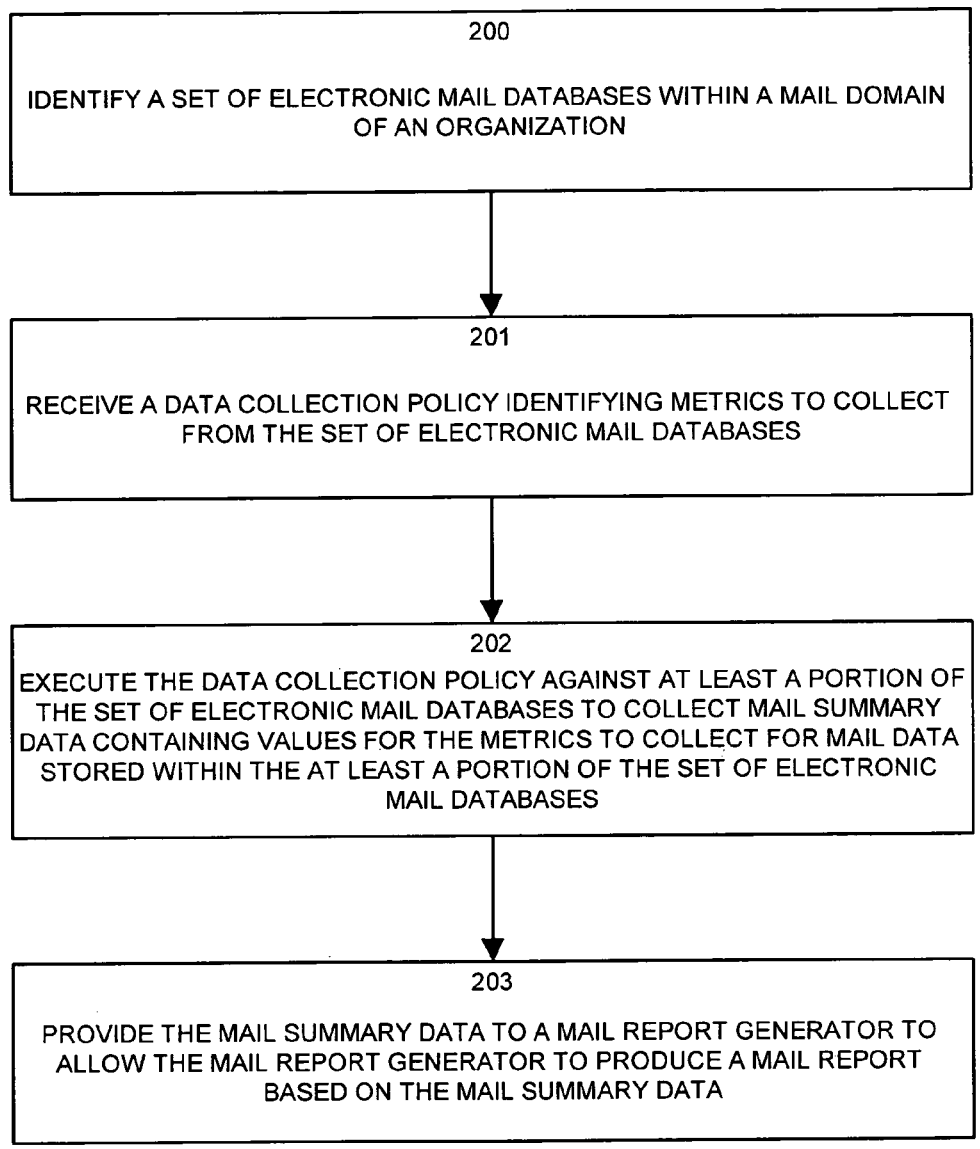
FIG. 3 is a flow chart of processing steps that show the general operation of an mail analyzer configured to collect and process electronic mail summary data information according to embodiments of the invention.

FIG. 3 is a flow chart of processing steps that the mail analyzer 190 performs to process data related to an electronic mail database in accordance with an example configuration.

In step 200, the mail analyzer 190 identifies a set of electronic mail databases 194 within a mail domain of an organization. In one configuration, the domain is an exchange-based mail domain within the organization. In a typical large organization of many hundreds of employees, there may be many different mail stores, each of which is an electronic mail database 194. Generally, a mail store 194 is a collection of mailboxes and folders. An administrator may arrange mail stores 194 by department, location, or the like. There may be one host computer 104 that manages many stores 194, or each host can operate a mail server software process 195 that manages a single respective store 194. In an exchange-based mail server environment, there may be different exchange servers 195 at different locations, and there may be many different stores 194 all stored in the same data storage system 102 and managed by a common mail server 195. In an exchange-based mail server environment, using a Microsoft product called "Active Directory", the mail analyzer system 190 can lookup and discover what mail servers maintain which electronic mail databases 194 (e.g., what exchange servers exist, and on each exchange server what storage groups exists, and what mail stores are in each group). The mail analyzer 190-1 is thus able to communicate with mail analyzers 190-2 through 190-X to discover the various electronic mail databases in operation throughout the network. Once the mail analyzer 190-1 has discovered the mail servers 195 and associated databases 194, the analyzer 190-1 can present this to the user 108 for selection of specific mail servers upon which to collect data.

Figure 5:
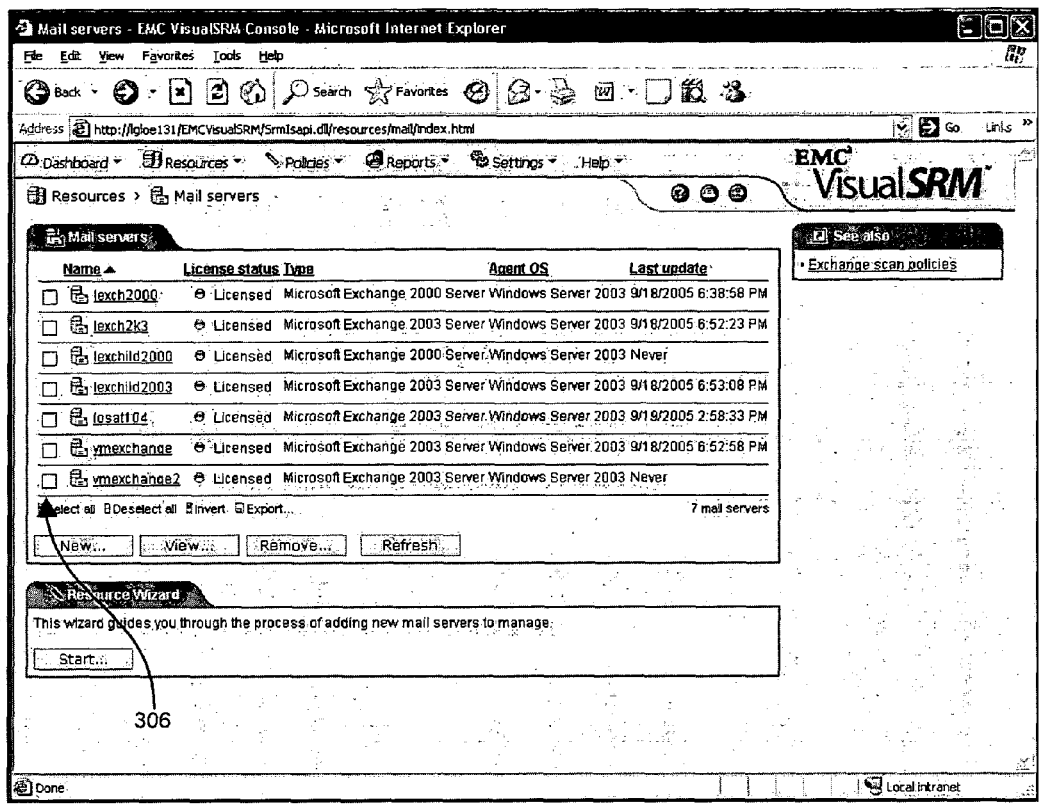
FIG. 5 is a second example graphical user interface of a mail analyzer configured in accordance with example embodiments of the invention to obtain a data collection policy.

FIG. 5 is a graphical user interface 160 that allows a user 108 to select which discovered electronic mail databases 194 are to be processed for metric collection in accordance with the techniques explained herein. In FIG. 5, the user 108 is able to check or uncheck (at location 306) specific electronic mail databases 194 for processing. Once selected, the user can identify metrics to collect concerning those mail databases 194.

Returning attention to the flow chart of processing steps in FIG. 3, in step 201, the mail analyzer 190 receives a data collection policy identifying metrics to collect from the set of electronic mail databases. This allows a user to specify which specific electronic mail databases 194 are to be scanned and for what types of metric information.

Figure 4:
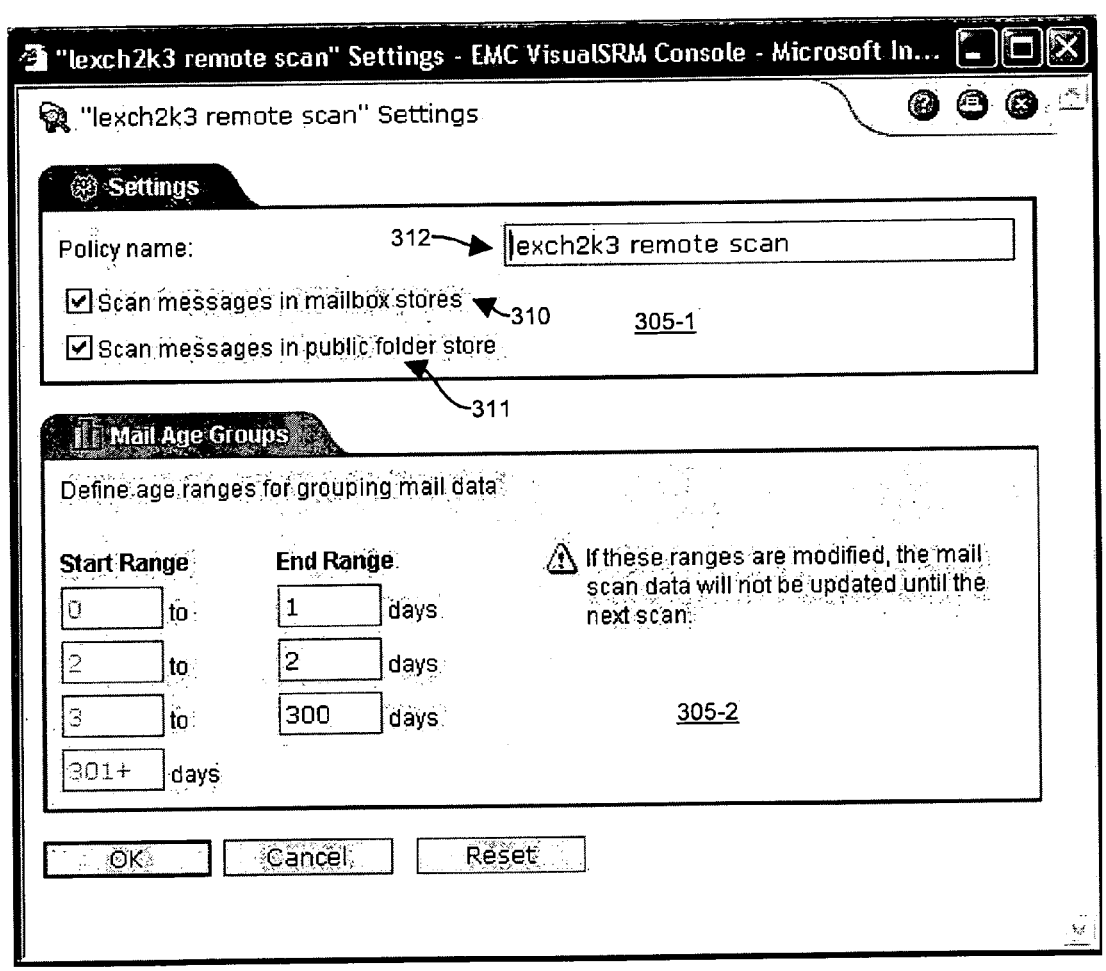
FIG. 4 is a first example graphical user interface of a mail analyzer configured in accordance with example embodiments of the invention to obtain a data collection policy.

FIG. 4 is graphical user interface 150 that allows a user 108 to select which metrics are to be collected in accordance with the techniques explained herein on mail and public folder data within the selected electronic mail databases 194 (selected using the graphical user interface in FIG. 5). The user can save the policy in a data collection policy named by the user at location 312 (the policy is named "lexch2K3 in this example). Using the graphical user interface 150, the user 108 is able to provide metrics 305-1 allowing the use to select, at location 310, if messages in mailbox stores 194 are to be scanned for metrics. The user is also able to select, at location 311, if messages in public folder stores 194 are to be scanned for metrics. Below location 305-1, the user is able to provide metrics 305-2 concerning age ranges into which mailbox messages, attachments or data in public folders may reside. During a scan of a mailbox or public folder (as will be explained), the mail analyzers 190-2 through 190-X can keep track of how many and what size messages or data are identified that fit into each of the user specified age ranges. Once the metrics are collected from the user 108, the mail analyzer 190-1 saves this information in the data collection policy 197 and distributed the policy to appropriate mail analyzers 190-2 through 190-X (depending upon what databases 194 the user has selected for scanning).

In FIG. 3, step 202, the mail analyzer(s) 190-2 through 190-X execute the data collection policy against at least a portion of the set of electronic mail databases 194 to collect mail summary data 199 containing values for the metrics for mail data (i.e., electronic mail message in mailboxes, or data in public folders) stored within the at least a portion of the set of electronic mail databases. In one configuration, the mail summary data identifies count, size and age metrics for specific users mailboxes and public folders of exchange-based mail servers operating to store the electronic mail databases within a storage area network. The Active Directory system can be used to query the mail servers to traverse a mail store 194 to identify the required metrics. During execution of the data collection policy 194, the mail analyzers 190-2 through 190-X scan the mailboxes and public folders and maintain the counts, sizes and other specified metrics. Upon completion, a collective set of values for the specified metrics will be been collected and saved for each object (e.g. each mailbox or each public folder) identified in each mail store 194. During collection of metrics for each object, that mail summary data 199 for that object is maintained locally within the host 104.

In step 203, upon completion of collection of mail summary data (e.g. for each object), the mail analyzer 190 provides the mail summary data 199 to a mail report generator 193 in the resource manager 120 to allow the mail report generator 193 to produce a mail report based on the mail summary data. From the following high level discussion, a more detailed analysis of processing of alternative embodiments will now be presented.

Figure 6:
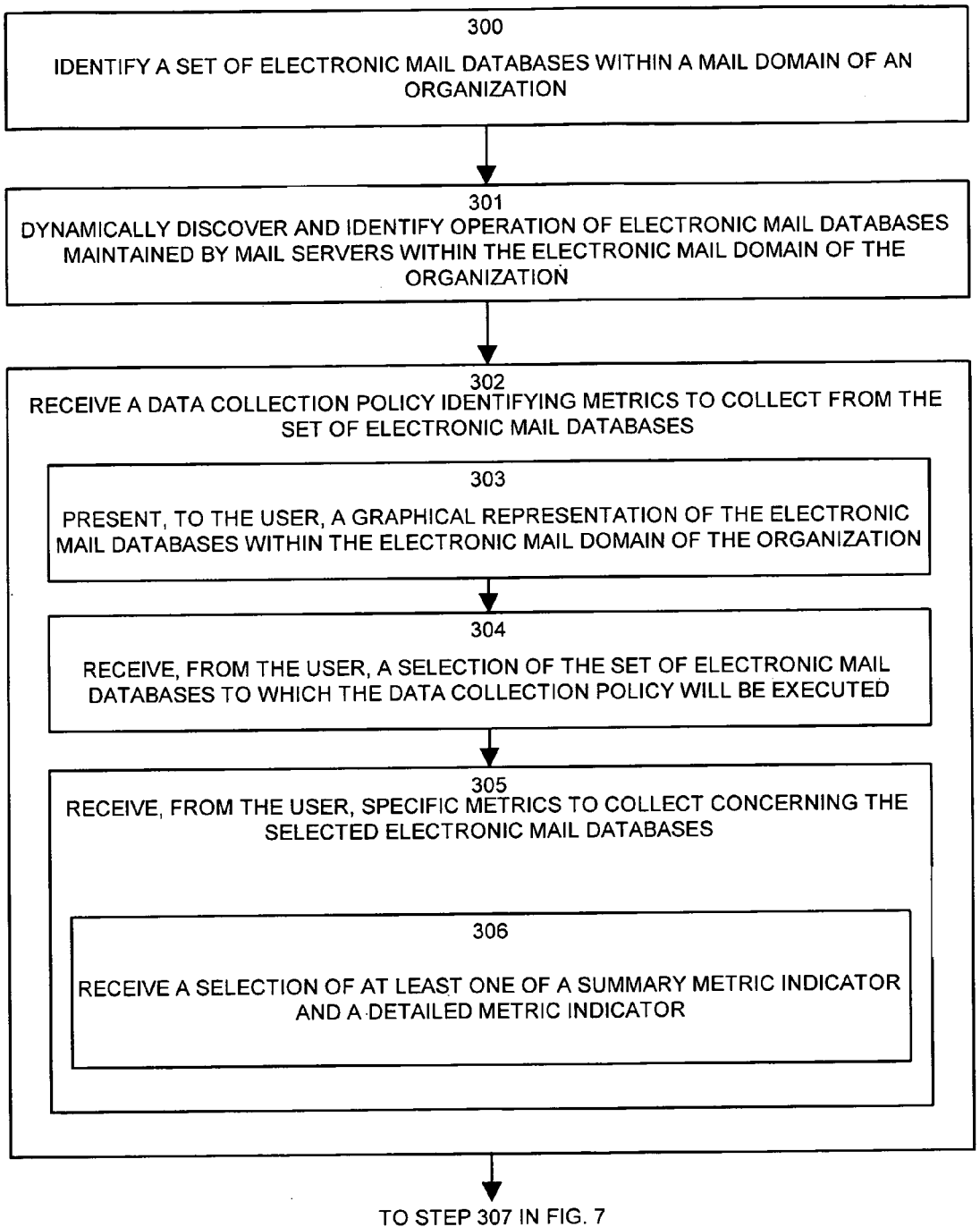
FIGS. 6 through 8 are a single flow chart of processing steps that show details of mail analyzer processing according to various example embodiments of the invention.
Figure 7:
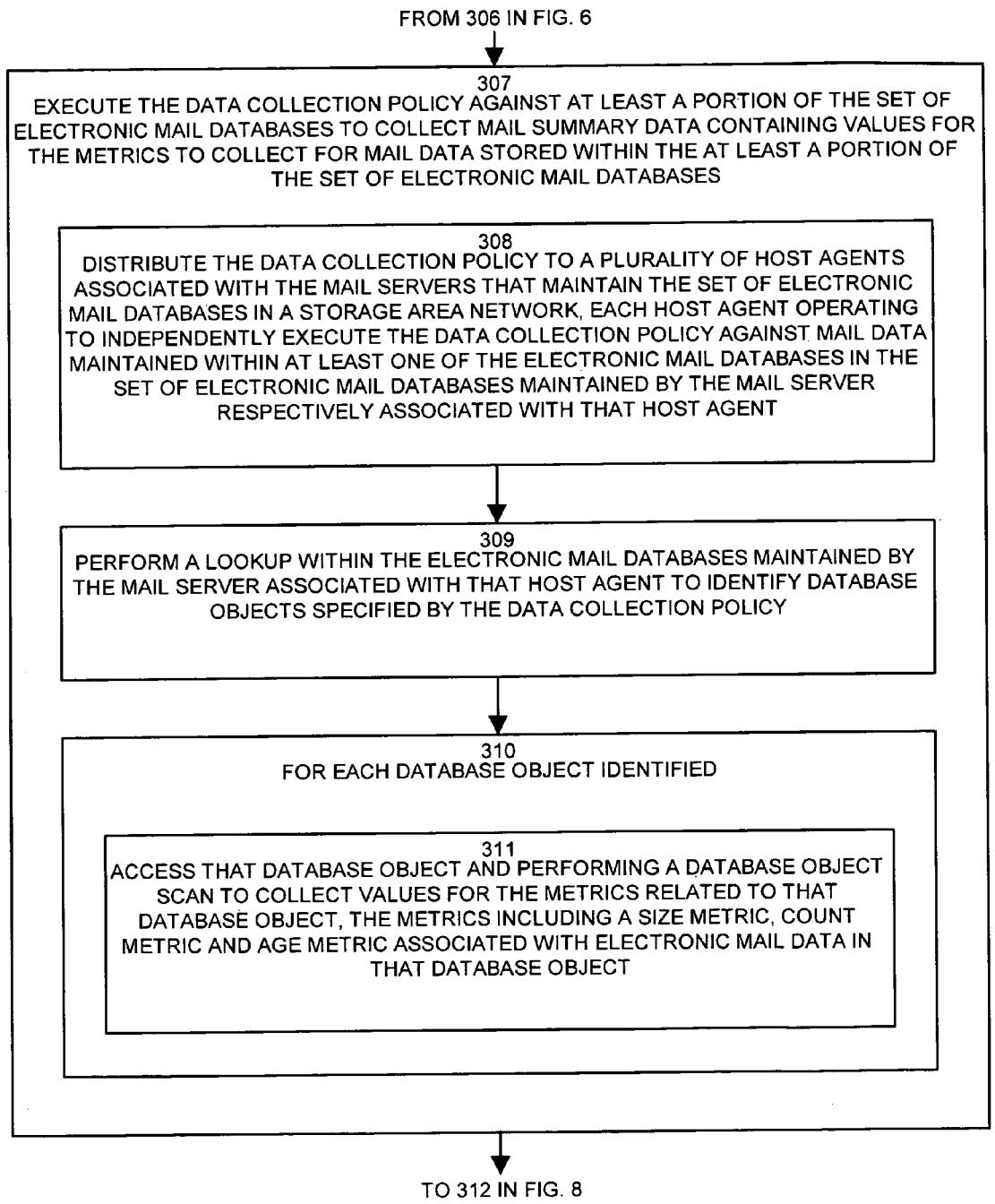
Figure 8:
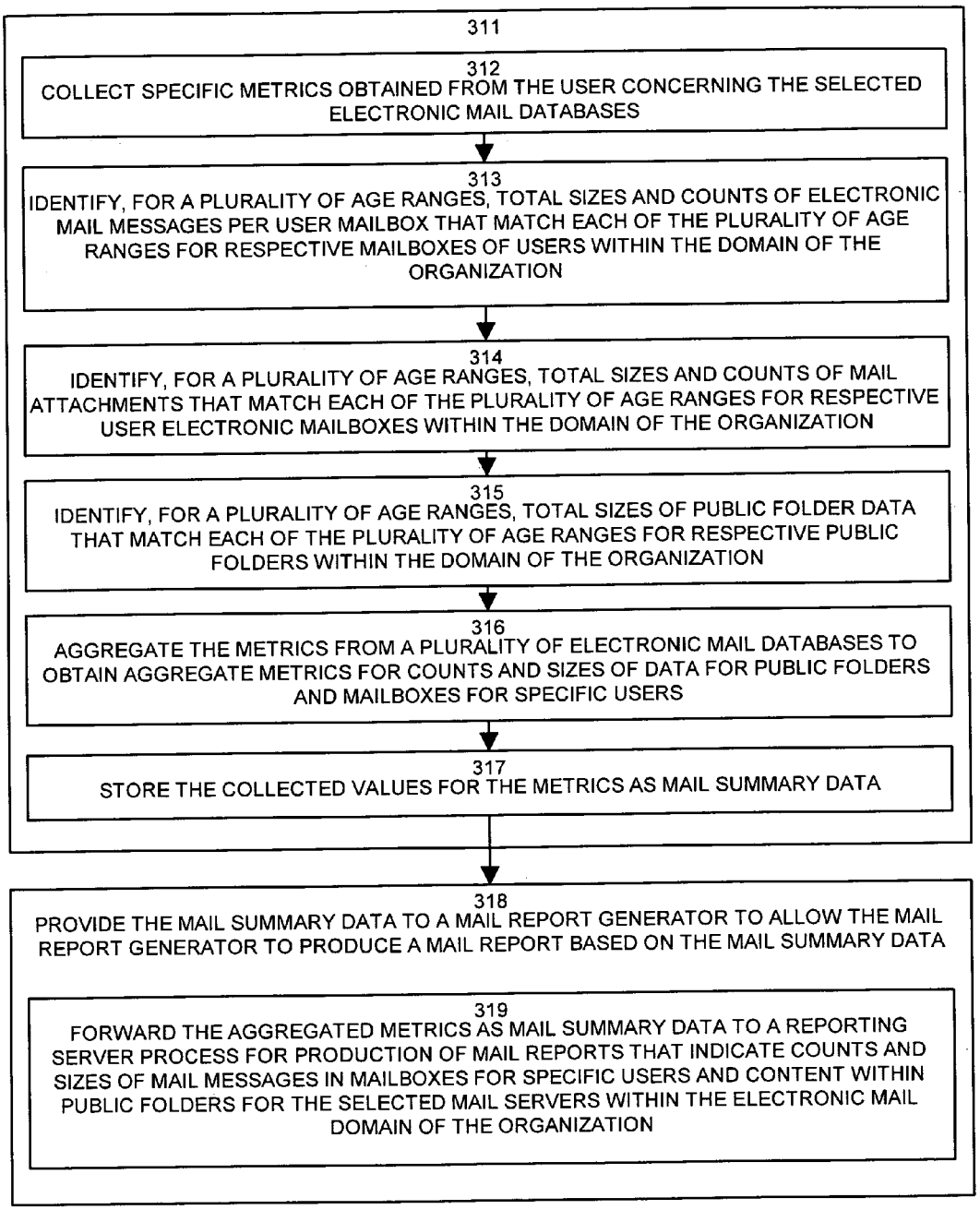

FIGS. 6 through 8 are a single flowchart illustrating more detailed operation of the mail analyzer 190 as configured in accordance with example embodiments.

Beginning in FIG. 6 at step 300, the mail analyzer 190 identifies a set of electronic mail databases 194 within a mail domain of an organization. Step 301 shows details of this processing in one example configuration.

In step 301, the mail analyzer 190 dynamically discovers and identifies operation of electronic mail databases maintained by mail servers within the electronic mail domain of the organization. This process was explained above in detail. In an alternative arrangement, the user can specify specific mail servers (e.g. in a list if more than one) by name.

In step 302, the mail analyzer 190 receives a data collection policy identifying metrics to collect from the set of electronic mail databases. Steps 303 through 306 show details of this processing in one example configuration.

In step 303, the mail analyzer 190 presents, to the user, a graphical representation of the electronic mail databases within the electronic mail domain of the organization.

This processing can present a tree-like hierarchical representation of the electronic mail databases 194 shown each store grouping, department, public folder repository or other database 194.

In step 304, the mail analyzer 190 receives, from the user, a selection of the set of electronic mail databases to which the data collection policy will be executed. This was explained above in the graphical user interface 160 in FIG. 5.

In step 305, the mail analyzer 190 receives, from the user, specific metrics to collect concerning the selected electronic mail databases. In the example above in the graphical user interface 150 in FIG. 4, the user can indicate metrics for either mailboxes and/or public folders. Step 306 shows details of this processing in another example configuration.

In step 306, the mail analyzer 190 receives a selection of at least one of a summary metric indicator and a detailed metric indicator. The summary metric indicator, if selected, indicates the user 108 desires to collect a high-level summary of metrics of interest to the user concerning mail or public folder data stored within the set of electronic mail databases against which the data collection policy 197 will be executed. The detailed metric indicator, if selected, indicates the user desires to collect detailed metrics of interest to the user concerning mail data stored within the set of electronic mail databases to which the data collection policy will be executed. Summary metrics might include, for example, a general summary of total counts and sizes of messages, attachments and data in mailboxes and public folders. A detailed metric collection might include determining age groups or buckets and determining into what age groups each of the counted mail messages, attachments and folder data belongs. In one configuration, summary or details metric control whether or not the age ranges and attachment data is included in the scan. If the scan policy is a summary scan, then only the basic count/size metrics for the mail data will be included. That is, the distribution of data into age ranges and the separation of message versus attachment data is not gathered for a summary scan. This information is only gathered for a detailed scan.

FIG. 7 is a continuation of the flow chart from step 306 in FIG. 6 and shows further processing in accordance with example embodiments.

In step 307, the mail analyzer 190 executes the data collection policy against at least a portion of the set of electronic mail databases 194 (the portion being those selected by the user in one configuration) to collect mail summary data 199 containing values for the metrics for mail data stored within the at least a portion of the set of electronic mail databases. Steps 308 through 311 show details of this processing in one example configuration.

In step 308, the mail analyzer 190 distributes the data collection policy 197 to a plurality of host agents (i.e., mail analyzers 190-2 through 190-X that operate as part of host agents on hosts 104) associated with the mail servers 195 that maintain the set of electronic mail databases 194 in a storage area network 100. Each host agent operates a mail analyzer process 190-2 through 190-X to independently execute the data collection policy 197 against mail data maintained within at least one of the electronic mail databases 194 in the set of electronic mail databases maintained by the mail server 195 respectively associated with that host agent.

Next, in step 309, each of the mail analyzers 190-2 through 190-X performs a lookup within the electronic mail databases 194 maintained by the mail server associated with that host agent to identify database objects specified by the data collection policy 197. As an example, if the user indicated to collect metric on both public folders and mailboxes, the mail analyzers 190-2 through 190-X can use the active directory application programming interface to the mail server 195 to identify the different objects (e.g. specific public folders and mailboxes) within these types of databases 194.

In step 310, each of the mail analyzers 190-2 through 190-X enters a processing loop performed for each database object identified. The loop can be performed, for example, for each public folder, and/or for each mailbox, or at a higher level of granularity so that each object is a specific store within a group of stores.

In step 311, within the processing look defined by step 310, each of the mail analyzers 190-2 through 190-X access that database object and perform a database object scan to collect values for the metrics related to that database object. The metrics include a size metric, count metric and age metric associated with electronic mail data in that database object. Further details of this scanning process will now be explained in the continuation of flow chart processing steps in FIG. 8.

FIG. 8 is a continuation of the flow chart from step 311 in FIG. 7. In FIG. 8, steps 312 through 317 show details of processing of step 311 in one example configuration.

In step 312, the mail analyzers 190-2 through 190-X collect specific metrics obtained from the user concerning the selected electronic mail databases. In more detailed embodiments, a user can specify very specific metrics (in step 305 for example) such as specific user names or public folder names to include or exclude in the scan. Alternatively, the user can indicate only certain types of data to scan for, such as files having a certain filename (e.g., *.mp3 files). In this manner, the metrics 305 obtained from the user defined when the scan processing increments counts, sizes and possible ages of files detected that match the user specified metrics.

In step 313, assuming the user selected to scan mailboxes, the mail analyzers 190-2 through 190-X identify, for a plurality of age ranges, total sizes and counts of electronic mail messages per user mailbox that match each of the plurality of age ranges for respective mailboxes of users within the domain of the organization.

In step 314, assuming the user selected to scan attachments, the mail analyzers 190-2 through 190-X identify, for a plurality of age ranges, total sizes and counts of mail attachments that match each of the plurality of age ranges for respective user electronic mailboxes within the domain of the organization.

In step 315, assuming the user selected to scan public folders, the mail analyzers 190-2 through 190-X identify, for a plurality of age ranges, total sizes of public folder data (e.g. files or other shared items) that match each of the plurality of age ranges for respective public folders within the domain of the organization.

In step 316, the mail analyzer 190 aggregates the metrics from a plurality of electronic mail databases 194 to obtain aggregate metrics for counts and sizes of data for public folders and mailboxes for specific users. This aggregation can be done locally on each host 104 any of the mail analyzers 190-2 through 190-X individually processed more than one database 194.

In step 317, the mail analyzer 190 temporarily stores the collected values for the metrics as mail summary data. In one configuration, the mail summary data is collected object by object, and after metrics are fully collected for an object, the mail analyzer on a host 104 can perform the aggregation process in step 316 and when complete, can forward the mail summary data 199 back to the mail analyzer 190-1 for placement into a repository for reporting purposes.

In step 318, the mail analyzer 190 provides the mail summary data 199 to a mail report generator 123 to allow the mail report generator 123 to produce a mail report based on the mail summary data. Step 319 shows details of this processing in one example configuration.

In step 319, the mail analyzer 190 forwards the aggregated metrics as mail summary data 199 to a reporting server process 123 (e.g. a report generator) for production of mail reports that indicate counts and sizes of mail messages in mailboxes for specific users and content within public folders for the selected mail servers 195 and databases 194 within the electronic mail domain of the organization.

In this manner, the system of the invention allows a detailed analysis of electronic mail data through out an entire organization's domain and distributes the processing across multiple host computer systems, thus not placing the entire processing burden on a single computer system.

As discussed, techniques herein are well suited for use in applications such as management of storage area networks. However, it should be noted that configurations herein are not limited to use in such applications and thus configurations herein and deviations thereof are well suited for other applications as well.

Other alternative arrangements of the invention include rearranging the processing steps explained above in the flow charts in such a way that the overall effect of the invention is the same. It is to be thus understood by those skilled in the art that the particular arrangement of processing steps in many instances does not specify the exact implementation of embodiments of the invention. As such, those skilled in the art of software development and computer-related technologies will understand that there can be many ways and orders of representing the processing operations explained above and such alternative software code will still achieve the overall operation as explained herein. In addition, embodiments of the invention are not limited to operation on the computer systems shown above. The mail analyzer 190, and SAN management application 132 can operate in the same computer system, or in different computer systems that may be shared computing resources, or can be distributed among any number of computer systems. Furthermore, embodiments of the invention are not limited to operation in a storage area network management application, but are intended to be generally applicable to any type of network management application. Accordingly, embodiments of the invention are not limited to the processing arrangements explained above.

What is claimed is:

1. A computer-implemented method for processing data related to an electronic mail database in which at least one computer system accesses instructions from computer storage and executes the instructions to perform steps of, the computer-implemented method identifying a set of electronic mail databases within a mail domain of an organization;

receiving a data collection policy identifying metrics to collect from the set of electronic mail databases;

executing the data collection policy against at least a portion of the set of electronic mail databases to collect mail summary data containing values for the metrics to collect for mail data stored within the at least a portion of the set of electronic mail databases;

providing the mail summary data to a mail report generator to allow the mail report generator to produce a mail report based on the mail summary data;

wherein receiving the data collection policy comprises:

(i) presenting, to a user, a graphical representation of the electronic mail databases within the electronic mail domain of the organization;

(ii) receiving, from the user, a selection of the set of electronic mail databases to which the data collection policy will be executed; and (iii) receiving, from the user, specific metrics to collect concerning the selected electronic mail databases;

wherein presenting, to the user, the graphical representation of the electronic mail databases within the electronic mail domain of the organization includes:

presenting a hierarchical tree representation of the electronic mail databases, wherein presenting the hierarchical tree representation includes:

indicating which of the electronic mail databases presented in the hierarchical tree representation is associated with a particular department of the organization; and indicating which of the electronic mail databases presented in the hierarchical tree representation is a public folder repository;

wherein executing the data collection policy comprises distributing the data collection policy to a plurality of host agents associated with mail servers maintaining the set of electronic mail databases in a storage area network;

wherein executing the data collection policy further comprises, within each host agent, performing a database object scan to collect values for the metrics related to a database object in order to identify, for a plurality of age ranges, total sizes and counts of electronic mail messages matching each of the plurality of age ranges for respective mailboxes of users within the domain of the organization;

wherein performing the database object scan to collect values for the metrics of interest to the user for the database object comprises:

(i) identifying, for the plurality of age ranges, total sizes and counts of mail attachments matching each of the plurality of age ranges for respective user electronic mailboxes within the domain of the organization; and (ii) identifying, for each mail attachment matching each of the plurality of age ranges for respective user electronic mailboxes, a length of time the mail attachment has been residing in the mailbox for the respective user, a size of the mail attachment residing in the mailbox for the respective user, and a file name of the mail attachment residing in the mailbox for the respective user; the computer-implemented method further comprising:

receiving a subsequent modification to the plurality of age ranges included in the specific metrics to collect concerning the selected electronic mail databases, the subsequent modification to the plurality of age ranges received at a first application window displayed separately from a second application window currently presenting the graphical representation of the electronic mail databases within the electronic mail domain of the organization; and presenting a warning message in the first application window, the warning message indicating an incorporation of the subsequent modification to the plurality of age ranges into the data collection policy after a current application of the data collection policy by the plurality of host agents, wherein presenting the warning message in the first application window includes:

presenting the warning message in a first portion of the first application window; and displaying a name of the data collection policy in a second portion of the first application window, wherein the first portion of the first application window is visually distinct from the second portion of the first application window.

2. The computer-implemented method as in claim 1, wherein identifying a set of electronic mail databases within a mail domain of an organization comprises:

dynamically discovering and identifying operation of electronic mail databases maintained by mail servers within the electronic mail domain of the organization.

3. The computer-implemented method of claim 1 wherein receiving a data collection policy identifying metrics to collect from the set of electronic mail databases comprises:

receiving a selection of at least one of a summary metric indicator and a detailed metric indicator, the summary metric indicator, when selected, indicating the user desires to collect a high-level summary of metrics of interest to the user concerning mail data stored within the set of electronic mail databases to which the data collection policy will be executed, the detailed metric indicator, when selected, indicating the user desires to collect detailed metrics of interest to the user concerning mail data stored within the set of electronic mail databases to which the data collection policy will be executed.

4. The computer-implemented method of claim 1 wherein executing the data collection policy against at least a portion of the set of electronic mail databases comprises: operating each host agent independently by executing the data collection policy against mail data maintained within at least one of the electronic mail databases in the set of electronic mail databases maintained by the mail server respectively associated with the host agent.

5. The computer-implemented method of claim 4 wherein, within each host agent, executing the data collection policy against at least a portion of the set of electronic mail databases comprises:

performing a lookup within the electronic mail databases maintained by the mail server associated with the host agent to identify database objects specified by the data collection policy;

for each database object identified:

accessing the database object and performing the database object scan to collect values for the metrics related to the database object, the metrics including a size metric, count metric and age metric associated with electronic mail data in the database object; and storing the collected values for the metrics as mail summary data.

6. The computer-implemented method of claim 5 wherein performing the database object scan to collect values for the metrics related to the database object comprises:

identifying, for the plurality of age ranges, total sizes of public folder data matching each of the plurality of age ranges for respective public folders within the domain of the organization.

7. The computer-implemented method of claim 5 wherein the database objects in each electronic mail database include at least one of server objects, storage groups, electronic mail stores including at least one mailbox, public folders and mail data files maintained by the mail servers, and wherein for each database object identified, the method comprises:

collecting specific metrics obtained from the user concerning the selected electronic mail databases;

aggregating the metrics from a plurality of electronic mail databases to obtain aggregate metrics for counts and sizes of data for public folders and mailboxes for specific users; and forwarding the aggregated metrics as mail summary data to a reporting server process for production of mail reports indicating counts and sizes of mail messages in mailboxes for specific users and content within public folders for the selected mail servers within the electronic mail domain of the organization.

8. The computer-implemented method of claim 7 wherein the domain is an exchange-based mail domain within the organization and wherein the mail summary data identifies count, size and age metrics for specific users mailboxes and public folders of exchange-based mail servers operating to store the electronic mail databases within a storage area network.

9. The computer-implemented method as in claim 1, wherein performing a database object scan to identify, for the plurality of age ranges, total sizes and counts of electronic mail messages per user mailbox matching each of the plurality of age ranges for respective mailboxes of users within the domain of the organization includes:

scanning the database object according to each age range specified in the plurality of age ranges; and for each mailbox:
(i) determining a total number of electronic mail messages stored in the mailbox for no more than a first number of days, the first number of days specified in the plurality of age ranges as a first age range;
(ii) determining a total number of electronic mail messages stored in the mailbox for longer than the first number of days and for no more than a second number of days, the second number of days specified in the plurality of age ranges as a second age range;
(iii) determining a total number of electronic mail messages stored in the mailbox for longer than the second number of days and for no more than a third number of days, the third number of days specified in the plurality of age ranges as a third age range.

10. The computer-implemented method as in claim 1, wherein performing a database object scan to identify, for the plurality of age ranges, total sizes and counts of electronic mail messages per user mailbox matching each of the plurality of age ranges for respective mailboxes of users within the domain of the organization includes:

for each mailbox:
identifying at least a first mail attachment stored in the mailbox for no more than a first duration of time;
identifying at least a second mail attachment stored in the mailbox for longer than the first duration of time and for no more than a second duration of time; and
identifying at least a third mail attachment stored in the mailbox for longer than the second duration of time and for no more than a third duration of time.

11. The computer-implemented method as in claim 1, wherein receiving, from the user, specific metrics includes:
prior to executing the data collection policy, receiving a selection, from the user, of multiple, distinct time spans to be included in the plurality of age ranges.

12. The computer-implemented method as in claim 1, comprising:
wherein receiving the subsequent modification to the plurality of age ranges includes: detecting user input representative of an upcoming request to modify the plurality of age ranges in accordance with at least one user-selected range boundary; and
wherein presenting the warning message includes: presenting the warning message prior to receiving a request to apply a modification to the plurality of age ranges in accordance with the at least one user-selected range boundary.

13. At least one computer system comprising:
a memory;
a processor;
a communications interface;
an interconnection mechanism coupling the memory, the processor and the communications interface;
wherein the memory is encoded with a mail analyzer application performing on the processor to provide a mail analyzer process for processing data related to an electronic mail database by performing operations of:
identifying, via the communications interface, a set of electronic mail databases within a mail domain of an organization;
receiving a data collection policy identifying metrics to collect from the set of electronic mail databases;
executing the data collection policy against at least a portion of the set of electronic mail databases to collect mail summary data containing values for the metrics to collect for mail data stored within the at least a portion of the set of electronic mail databases;
providing the mail summary data to a mail report generator to allow the mail report generator to produce a mail report based on the mail summary data;
wherein receiving the data collection policy comprises:
(i) presenting, to a user, a graphical representation of the electronic mail databases within the electronic mail domain of the organization;
(ii) receiving, from the user, a selection of the set of electronic mail databases to which the data collection policy will be executed; and
(iii) receiving, from the user, specific metrics to collect concerning the selected electronic mail databases;
wherein presenting, to the user, the graphical representation of the electronic mail databases within the electronic mail domain of the organization includes:
presenting a hierarchical tree representation of the electronic mail databases, wherein presenting the hierarchical tree representation includes:
indicating which of the electronic mail databases presented in the hierarchical tree representation is associated with a particular department of the organization; and
indicating which of the electronic mail databases presented in the hierarchical tree representation is a public folder repository;
wherein executing the data collection policy comprises distributing the data collection policy to a plurality of host agents associated with mail servers maintaining the set of electronic mail databases in a storage area network;
wherein executing the data collection policy further comprises, within each host agent, performing a database object scan to collect values for the metrics related to a database object in order to identify, for a plurality of age ranges, total sizes and counts of electronic mail messages matching each of the plurality of age ranges for respective mailboxes of users within the domain of the organization;

wherein performing the database object scan to collect values for the metrics of interest to the user for the database object comprises:
(i) identifying, for the plurality of age ranges, total sizes and counts of mail attachments matching each of the plurality of age ranges for respective user electronic mailboxes within the domain of the organization; and
(ii) identifying, for each mail attachment matching each of the plurality of age ranges for respective user electronic mailboxes, a length of time the mail attachment has been residing in the mailbox for the respective user, a size of the mail attachment residing in the mailbox for the respective user, and a file name of the mail attachment residing in the mailbox for the respective user;

the mail analyzer further performing operations of:
receiving a subsequent modification to the plurality of age ranges included in the specific metrics to collect concerning the selected electronic mail databases, the subsequent modification to the plurality of age ranges received at a first application window displayed separately from a second application window currently presenting the graphical representation of the electronic mail databases within the electronic mail domain of the organization; and
presenting a warning message in the first application window, the warning message indicating an incorporation of the subsequent modification to the plurality of age ranges into the data collection policy after a current application of the data collection policy by the plurality of host agents,
wherein presenting the warning message in the first application window includes:
presenting the warning message in a first portion of the first application window; and
displaying a name of the data collection policy in a second portion of the first application window,
wherein the first portion of the first application window is visually distinct from the second portion of the first application window.

14. The at least one computer system of claim 13, wherein identifying a set of electronic mail databases within a mail domain of an organization comprises:
dynamically discovering and identifying operation of electronic mail databases maintained by mail servers within the electronic mail domain of the organization.

15. The at least one computer system of claim 13 wherein receiving a data collection policy identifying metrics to collect from the set of electronic mail databases comprises operations of:
receiving a selection of at least one of a summary metric indicator and a detailed metric indicator, the summary metric indicator, when selected, indicating the user desires to collect a high-level summary of metrics of interest to the user concerning mail data stored within the set of electronic mail databases to which the data collection policy will be executed, the detailed metric indicator, when selected, indicating the user desires to collect detailed metrics of interest to the user concerning mail data stored within the set of electronic mail databases to which the data collection policy will be executed.

16. The at least one computer system of claim 13 wherein executing the data collection policy against at least a portion of the set of electronic mail databases comprises operating each host agent independently by executing the data collection policy against mail data maintained within at least one of the electronic mail databases in the set of electronic mail databases maintained by the mail server respectively associated with the host agent.

17. The at least one computer system of claim 16 wherein, within each host agent, executing the data collection policy against at least a portion of the set of electronic mail databases comprises operations of:
performing a lookup within the electronic mail databases maintained by the mail server associated with the host agent to identify database objects specified by the data collection policy;
for each database object identified:
accessing the database object and performing the database object scan to collect values for the metrics related to the database object, the metrics including a size metric, count metric and age metric associated with electronic mail data in the database object; and
storing the collected values for the metrics as mail summary data.

18. The at least one computer system of claim 17 wherein performing the database object scan to collect values for the metrics related to the database object comprises operations of:
identifying, for the plurality of age ranges, total sizes of public folder data matching each of the plurality of age ranges for respective public folders within the domain of the organization.

19. The at least one computer system of claim 17 wherein the database objects in each electronic mail database include at least one of server objects, storage groups, electronic mail stores including at least one mailbox, public folders and mail data files maintained by the mail servers, and
wherein for each database object identified, the mail analyzer performs operations of:
collecting specific metrics obtained from the user concerning the selected electronic mail databases;
aggregating the metrics from a plurality of electronic mail databases to obtain aggregate metrics for counts and sizes of data for public folders and mailboxes for specific users; and
forwarding the aggregated metrics as mail summary data to a reporting server process for production of mail reports indicating counts and sizes of mail messages in mailboxes for specific users and content within public folders for the selected mail servers within the electronic mail domain of the organization; and
wherein the domain is an exchange-based mail domain within the organization and wherein the mail summary data identifies count, size and age metrics for specific users mailboxes and public folders of exchange-based mail servers operating to store the electronic mail databases within a storage area network.

20. A non-transitory computer readable medium encoded with computer programming logic, executed as a process in a computerized device to process data related to an electronic mail database, the computer readable medium comprising instructions for:
identifying a set of electronic mail databases within a mail domain of an organization;
receiving a data collection policy identifying metrics to collect from the set of electronic mail databases;
executing the data collection policy against at least a portion of the set of electronic mail databases to collect mail summary data containing values for the metrics to collect for mail data stored within the at least a portion of the set of electronic mail databases;

providing the mail summary data to a mail report generator to allow the mail report generator to produce a mail report based on the mail summary data;

wherein receiving the data collection policy comprises:
- (i) presenting, to a user, a graphical representation of the electronic mail databases within the electronic mail domain of the organization;
- (ii) receiving, from the user, a selection of the set of electronic mail databases to which the data collection policy will be executed; and
- (iii) receiving, from the user, specific metrics to collect concerning the selected electronic mail databases;

wherein presenting, to the user, the graphical representation of the electronic mail databases within the electronic mail domain of the organization includes:
- presenting a hierarchical tree representation of the electronic mail databases, wherein presenting the hierarchical tree representation includes:
  - indicating which of the electronic mail databases presented in the hierarchical tree representation is associated with a particular department of the organization; and
  - indicating which of the electronic mail databases presented in the hierarchical tree representation is a public folder repository;

wherein executing the data collection policy comprises distributing the data collection policy to a plurality of host agents associated with mail servers maintaining the set of electronic mail databases in a storage area network;

wherein executing the data collection policy further comprises, within each host agent, performing a database object scan to collect values for the metrics related to a database object in order to identify, for a plurality of age ranges, total sizes and counts of electronic mail messages matching each of the plurality of age ranges for respective mailboxes of users within the domain of the organization;

wherein performing the database object scan to collect values for the metrics of interest to the user for the database object comprises:
- (i) identifying, for the plurality of age ranges, total sizes and counts of mail attachments matching each of the plurality of age ranges for respective user electronic mailboxes within the domain of the organization; and
- (ii) identifying, for each mail attachment matching each of the plurality of age ranges for respective user electronic mailboxes, a length of time the mail attachment has been residing in the mailbox for the respective user, a size of the mail attachment residing in the mailbox for the respective user, and a file name of the mail attachment residing in the mailbox for the respective user;

the non-transitory computer readable medium further comprising instructions for:
- receiving a subsequent modification to the plurality of age ranges included in the specific metrics to collect concerning the selected electronic mail databases, the subsequent modification to the plurality of age ranges received at a first application window displayed separately from a second application window currently presenting the graphical representation of the electronic mail databases within the electronic mail domain of the organization; and
- presenting a warning message in the first application window, the warning message indicating an incorporation of the subsequent modification to the plurality of age ranges into the data collection policy after a current application of the data collection policy by the plurality of host agents, wherein presenting the warning message in the first application window includes:
- presenting the warning message in a first portion of the first application window; and
- displaying a name of the data collection policy in a second portion of the first application window,
- wherein the first portion of the first application window is visually distinct from the second portion of the first application window.

\* \* \* \* \*